Patented Apr. 1, 1952

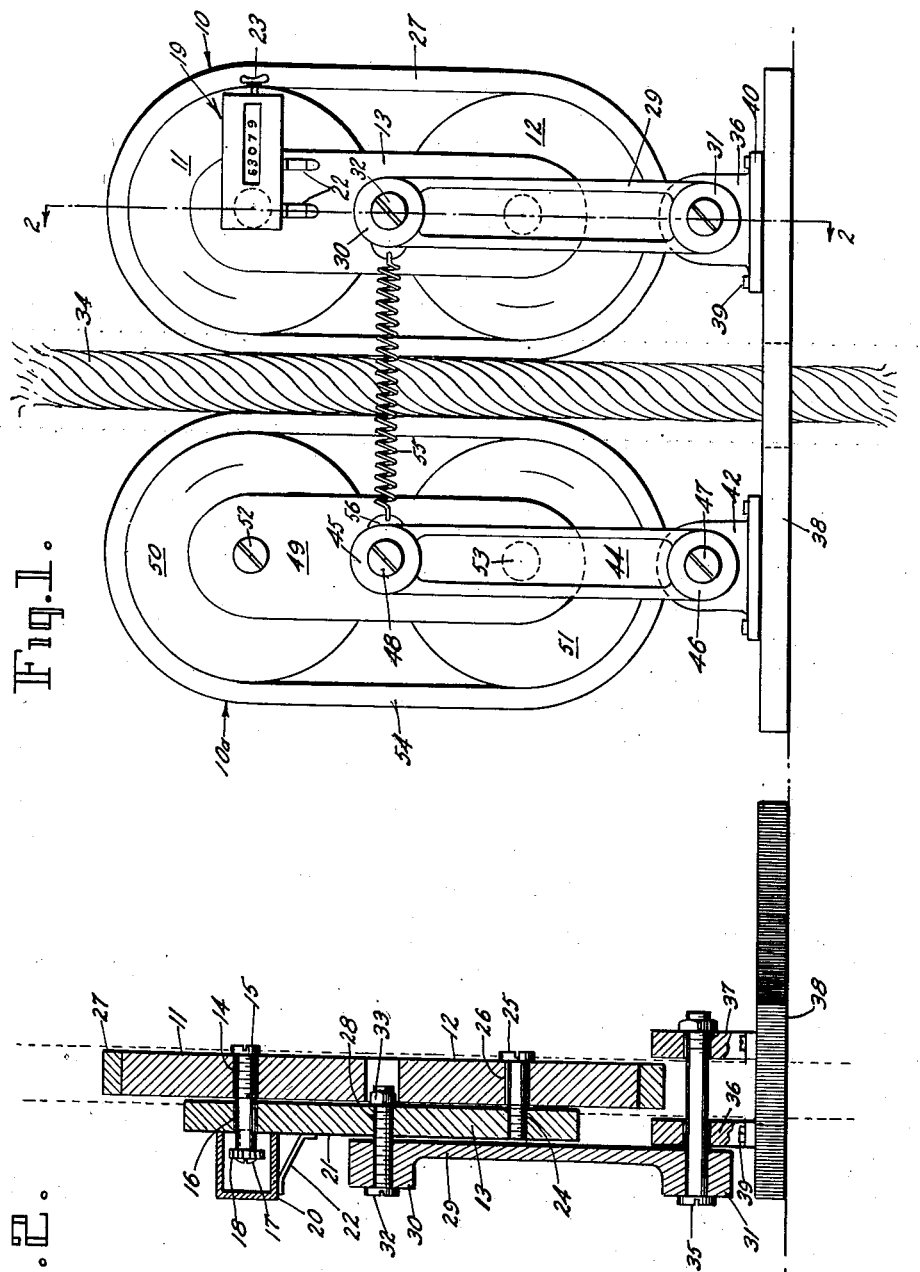

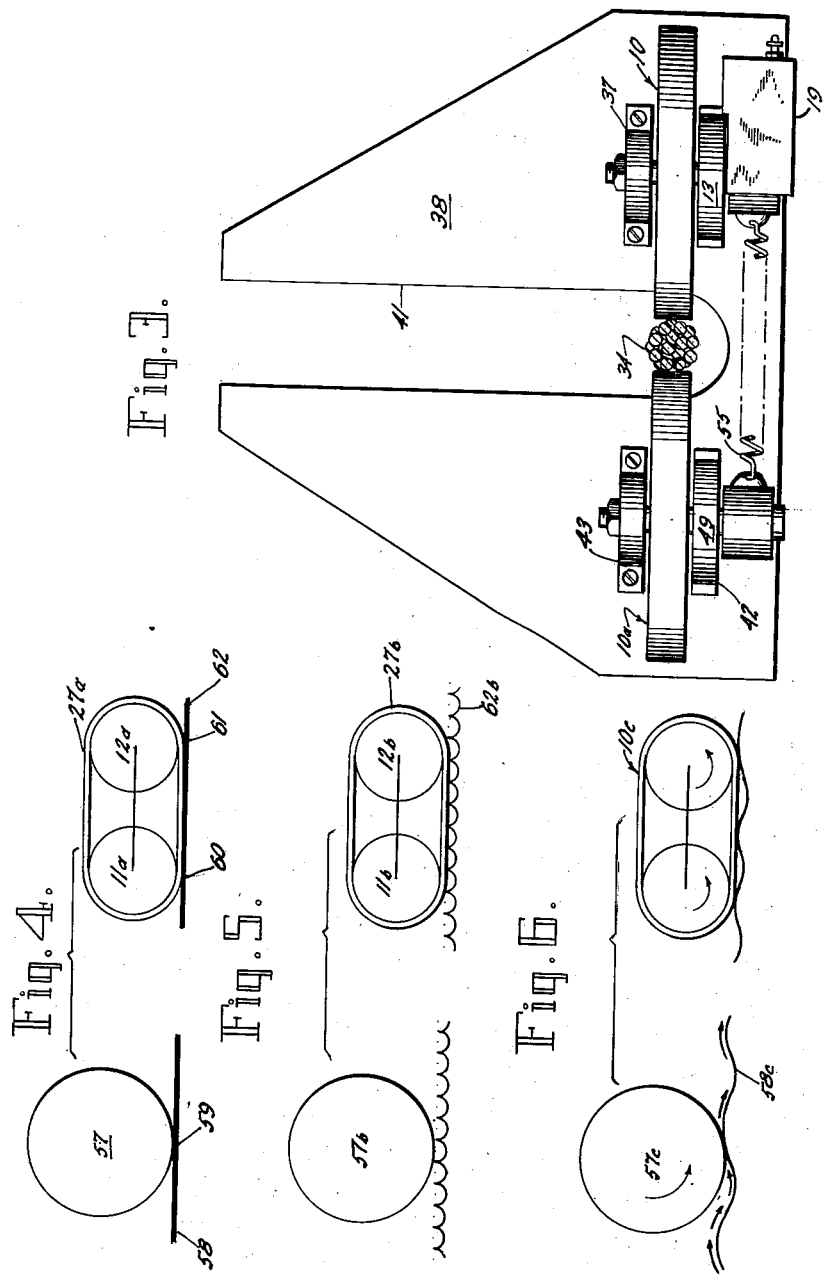

2,591,615

UNITED STATES PATENT OFFICE 2,591,615

ROLLING CONTACT MEASURING DEVICE

Adrian F. Saff and Daniel W. Uber, Kane, Pa.

Application December 14, 1949, Serial No. 132,824

2 Claims. (Cl. 33—129)

This invention relates to measuring devices, and has for its object the provision of an apparatus which will effectively measure lengths, distances and depths.

Another object of the invention is to provide an apparatus which can be used independently for measuring material such as cloth, lumber, rope, cable wire, sheet metal, pipe, etc., or may be combined with an idler to measure the depth of wells, lakes, etc. by contact with drill pipes, cables or other objects as lowered through the apparatus.

A further object of our invention is to provide a device wherein customary slippage is eliminated by means of increased frictional surfaces.

Still another advantage of the invention is in the elimination of vibrations when used on rough surfaces (such as woven cable) as customarily experienced with conventional measuring wheels.

A further advantage in the present measuring apparatus lies in the fact that straight line measurements on corrugated or irregular surfaces may be had with extreme accuracy.

Still another advantage in our invention is that the present structure brings about the elimination of wear to the actual measuring wheel of the device. This prevents changes in the diameter and circumference of the wheel which consequently render a device partially or totally inaccurate.

Still other objects and advantages will become apparent from the following description of the present invention illustrated in the accompanying drawings, in which:

Figure 1 is an elevational view of the measuring apparatus.

Figure 2 is a sectional view taken on line 2—2 of Figure 1.

Figure 3 is a plan view of the invention.

Figures 4, 5 and 6 are diagrammatic illustrations comparing the use of the present invention with conventional measuring wheels when applied to surfaces of varying texture.

Similar reference characters in the several figures represent similar parts.

The present invention has been devised with the intent of presenting a novel measuring device which will surpass similar equipment now on the market as to versatility and accuracy. Our device may be used on practically any type of solid material, as will become apparent in the detailed explanation which follows.

For the purpose of illustration we have shown in Figure 1 the actual measuring section designated generally as 10 and associated with an idler section 10ª in order to provide an apparatus which will effectively measure the length of rope or cable passing between the cooperating sections. Section 10 comprises a measuring wheel 11, and an adjacent lower wheel 12 similar in size to the measuring wheel. Wheels 11 and 12 are supported in juxtaposition at opposite ends of an elongated plate 13.

As best seen in Figure 2, measuring wheel 11 is provided with a central threaded aperture 14 adapted to receive a motion transmitting screw 15 which is firmly secured to the wheel and is rotatably supported on plate 13 by means of a drilled aperture 16. The headless end of screw 15 is counterbored in order to receive a threaded clamp screw 17 which may be inserted therein to retain a small cog wheel 18 in such a manner as to obviate any relative movement between cog wheel 18 and the measuring wheel 11. As will be apparent, revolving motion of the measuring wheel will automatically impart similar motion to cog wheel 18, which in turn controls the operation of a conventional counter 19.

The above-mentioned counter is enclosed in a box structure 20, which, in turn, is rigidly secured to the outer face 21 of plate 13 by alined brackets 22. As seen in Fig. 1, the counter is provided with an erasing tab 23 which will clear the counter board in preparation for each new measurement.

The lower wheel 12 is supported on the opposite end of plate 13 in a reverse arrangement from the structure as shown in connection with measuring wheel 11. From Figure 2 it will be seen the lower end of plate 13 is provided with a threaded aperture 24 in which may be secured screw 25 which serves as a pivot or axle for wheel 12. In order to obtain free rotation of wheel 12, the same is provided with a smooth drilled center aperture 26 of slightly greater diameter than the shank of screw 25.

A peripheral belt 27 which acts as a contact surface for the material to be measured is placed around wheels 11 and 12. As best seen in Fig. 1 of the drawing, the provision of the belt 27 affords an extended frictional surface which is far superior to the mere contact of a measuring wheel with the measured object, as will be seen later on in the description of the invention. Belt 27 may consist of a silent chain of steel, or may be made of rubber or other suitable composition material, depending upon the nature of the object to be measured. The belts are interchangeable and a belt of appropriate material may be readily applied to meet the demands of a particular job.

Plate 13 is provided with an aperture 28 centered upon the intersection of the plate's longitudinal and transverse axes. This provides a means for securing the dual wheel assembly to a vertical supporting post 29 shown in Figs. 1 and 2 of the drawings. Post 29 is provided at its upper and lower extremities with outwardly extending bosses 30 and 31, respectively. Each of these bosses is provided with a central aperture, the aperture in boss 30 being alined with plate aperture 28 to permit insertion of a coupling bolt 32. The free end of the coupling bolt accommodates a nut 33, which rests in the space between the peripheries of juxtaposed wheels 11 and 12.

Post 29 is rigidly held in a vertical position by means of a clamping bolt 35 which passes through the central aperture in boss 31 and extends through apertures formed in alined standards 36 and 37. These standards are firmly secured to a base plate 38 by means of screws 39 passing through foot extensions 40 located at the base of each standard. As seen in Fig. 2 of the drawings it is preferred that the supporting post 29 be rotatable on bolt 35 in order that the dual wheel apparatus will be free to pivot about bolt 35 to accommodate variations in the motion of the cable 34 or other material passing through the device.

As best seen in Fig. 3, the base plate is provided with an elongated central slot 41 which enables the plate to straddle the subject length of cable permitting contact between the cable and measuring apparatus 10. The end of plate 38 opposite to the measuring apparatus has fixed thereto a second pair of standards 42, 43, which are similar to the previously mentioned standards 36 and 37 and cooperate to pivotally support a second vertical post 44. This post has upper and lower bosses 45, 46, respectively, the lower boss being provided with a central aperture to receive a clamping bolt 47 for securing the post to standards 42, 43. Boss 45 of the vertical post is likewise provided with a central aperture for receiving a journaling bolt 48 which supports the idler mechanism 10ᵃ. The idler mechanism comprises substantially the same elements as does the measuring apparatus in that it contains a coupling plate 49 having journaled at opposite ends thereof idler wheels 50 and 51. As seen in Fig. 1 of the drawings, these idler wheels are rotatably mounted on plate 49 by means of journaling bolts 52, 53, respectively.

The entire idler mechanism is fixed to the upper end of the vertical post 44 by means of the aforementioned bolt 48. A peripheral bearing belt 54 surrounds the juxtaposed wheels 50 and 51, this belt being preferably formed of a material similar to that selected for belt 27 of the measuring apparatus.

The purpose of locating these dual wheels on each side of the material to be measured is that the resilient force created by a connecting coil spring 55 causes the opposing sections to retain engagement with the material and bear upon it with sufficient force to prevent any possible slippage. Coil spring 55 may have the ends thereof removably attached in any convenient way to the central portion of each section of the device. For purposes of illustration we have shown a protuberance 56 formed on the upper end of the vertical supporting posts associated with each section.

From the above description of the cooperating sections 10 and 10ᵃ it will be apparent that the combination of the force created by spring 55 and the abundant frictional surface presented by belt 27 of the measuring apparatus will bring about such contact between the device and the material passing therethrough as to insure accurate measurement due to elimination of slippage.

It is of course to be understood that the association of sections 10 and 10ᵃ have been shown merely for the purpose of illustration, and that the measuring section 10 can be used alone very effectively as a hand measuring device for determining distances on roadways, sidewalks, floors, walls, etc. The main use of sections 10 and 10ᵃ together is for an accurate check of the depth of oil, gas and water wells by measuring the drill pipe, drill cable or bailer line, as it is lowered into the well. Likewise, the depth of rivers, lakes or even oceans can be checked by lowering a cable or wire through the device.

In order to more clearly illustrate the advantages obtained by using juxtaposed wheels surrounded by an elongated belt, we have shown in Figs. 4, 5 and 6 diagrammatic representations of both the conventional single wheel measuring device and the measuring apparatus embodying the present invention. Upon referring to Fig. 4 it will be readily understood why the factor of slippage is inevitably present in a conventional single measuring wheel. Theoretically the only contact between the measuring wheel 57 and the measured material 58 is the point of tangency at 59 between the periphery of the wheel and the contact surface of the material. On the other hand, with the use of an enveloping belt 27ᵃ it is seen that the frictional surface afforded by our device extends from the point of tangency between one wheel 11ᵃ and its adjacent wheel 12ᵃ, namely, a distance from a point represented at 60 to a second point represented at 61. This infinitely increased area of contact is sufficient to insure synchronized movement of belt 27ᵃ and the measured material 62.

In measuring rough surfaces or woven cable the factor of vibration enters into the picture when a single measuring wheel is used. In Fig. 5 it will be seen how the lone wheel 57ᵇ will of necessity progress along a rough or bumpy course creating considerable vibration which tends not only to damage the measuring device, but to result in inaccuracies in total measurement. Contrary to this result the use of dual wheels 11ᵇ, 12ᵇ and their cooperating belt 27ᵇ, allows the measured material 62ᵇ to assume a smooth path of travel past the measuring apparatus. With this structure the amount of vibration transmitted to the counter mechanism is negligible.

From Fig. 6 of the drawings it will be seen that a single measuring wheel 57ᶜ, when in contact with an extremely rough surface 58ᶜ such as cross braided steel cable, will follow the undulations, and as a result the distance measured will be in reality a surface distance rather than the accurate measurement from one point to a second point on the measured material. On the other hand, the use of a dual wheel measuring apparatus 10ᶜ permits straight line measurements to be obtained and the depressions in the surface of the measured material will have no affect on the obtaining of an exact reading of the true distance between points on the material.

The important feature of elimination of wear to the actual measuring wheel cannot be overemphasized. As this is apparent in each of the figures in the drawing, the measuring wheel of the present invention is completely protected from abrasion since the surface of the measured material is contacted only by the encircling belt. In other wheel-type measuring devices available the actual measuring wheel is in direct contact with the material being measured and the resultant wear encountered from cable or other abrasive material changes the diameter and circumference of the wheel, thereby rendering the device partially or totally inaccurate. In our device not only is the measuring wheel so protected, but a further advantage lies in the fact that it is but necessary to replace a worn belt to permit economical and permanently accurate operation of the apparatus.

From the foregoing description of the present invention it will be apparent that the measuring apparatus which we have devised is predominantly simple in structure and extremely economical in manufacture and maintenance. At the same time this measuring equipment possesses a versatility unavailable in similar devices now known.

While the preferred form of the invention has been shown and described it will be understood that variation in details of form may be made without departure from the invention as defined in the appended claims.

We claim:
1. A measuring device comprising a base member having a slot therein for receiving the material to be measured, spaced standards pivotally mounted on said base member on each side of said slot and extending upwardly therefrom, an elongated plate pivotally mounted intermediate its ends on the upper end of each of said standards, a wheel mounted on each end of said plate, the wheels on both plates being aligned and the wheels on each plate having an endless belt connecting the peripheries thereof, the adjacent runs of said belts being spaced to permit the material to be measured to pass therebetween, and resilient means for urging both of said belts against said material.

2. A measuring device comprising a base member having an opening therein for receiving the material to be measured, a pair of spaced standards pivotally mounted on said base member and extending upwardly therefrom, an elongated plate for each of said standards, means pivotally mounting each plate on the upper end of its standard, a wheel rotatably mounted on each end of said plates, said wheels on both plates being rotatable in a common plane, an endless belt connecting the peripheries of the wheels on each of said plates, the adjacent runs of said belts being in parallelism and spaced to permit the material to be measured to pass therebetween, and resilient means for urging both of said belts against said material.

ADRIAN F. SAFF.
DANIEL W. UBER.

REFERENCES CITED

The following references are of record in the file of this patent:

UNITED STATES PATENTS

| Number | Name | Date |
|---|---|---|
| 2,033,970 | Anderson | Mar. 17, 1936 |
| 2,060,233 | Mathey et al. | Nov. 10, 1936 |
| 2,074,524 | Uber | Mar. 23, 1937 |
| 2,081,102 | Blue | May 18, 1937 |
| 2,087,335 | Seeley | July 20, 1937 |
| 2,121,870 | Greene | June 28, 1938 |
| 2,136,457 | Nixon | Nov. 15, 1938 |
| 2,163,402 | Mason | June 20, 1939 |

FOREIGN PATENTS

| Number | Country | Date |
|---|---|---|
| 115,871 | Austria | Jan. 25, 1930 |